US009517727B2

United States Patent
Tiboni et al.

(10) Patent No.: US 9,517,727 B2
(45) Date of Patent: Dec. 13, 2016

(54) POCKET FORMING TRIM PANEL FOR A VEHICLE DOOR AND METHOD

(71) Applicant: GM GLOBAL TECHNOLOGY OPERATIONS LLC, Detroit, MI (US)

(72) Inventors: Adelchi R. Tiboni, São Paulo (BR); Fernando A. Siqueira, São Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 14/277,879

(22) Filed: May 15, 2014

(65) Prior Publication Data

US 2015/0329057 A1  Nov. 19, 2015

(51) Int. Cl.
| | | |
|---|---|---|
| B60R 13/02 | (2006.01) | |
| B60R 7/04 | (2006.01) | |
| B62D 65/14 | (2006.01) | |
| B29D 99/00 | (2010.01) | |
| B29C 65/60 | (2006.01) | |
| B60J 5/04 | (2006.01) | |
| B29L 31/30 | (2006.01) | |

(52) U.S. Cl.
CPC ............ *B60R 7/046* (2013.01); *B29C 65/606* (2013.01); *B29D 99/001* (2013.01); *B60J 5/04* (2013.01); *B60R 13/0243* (2013.01); *B62D 65/14* (2013.01); *B29L 2031/3041* (2013.01); *Y10T 29/49828* (2015.01); *Y10T 29/49877* (2015.01)

(58) Field of Classification Search
CPC .................. B60R 7/046; B29D 99/001; B29L 2031/30411; B60J 5/04; B29C 65/606; B62D 65/14; Y10T 29/49828; Y10T 29/49877
USPC ....................................................... 296/37.13
See application file for complete search history.

(56) References Cited

U.S. PATENT DOCUMENTS

| | | | |
|---|---|---|---|
| 7,997,635 B2* | 8/2011 | Ercolano et al. ............ 296/37.1 |
| 8,152,234 B2* | 4/2012 | Terleski et al. .......... 297/188.04 |
| 8,544,928 B2* | 10/2013 | Orlowsky et al. ......... 296/37.13 |
| 8,740,293 B1* | 6/2014 | Hayes .......................... 296/208 |
| 2005/0252940 A1* | 11/2005 | Brandstetter ........... B60R 7/046 224/543 |
| 2007/0284902 A1* | 12/2007 | Reed et al. ................ 296/37.16 |
| 2008/0073927 A1* | 3/2008 | Schoemann et al. ........ 296/37.1 |
| 2008/0110950 A1* | 5/2008 | Dowd et al. ................... 224/547 |
| 2010/0146862 A1* | 6/2010 | Lin et al. ........................ 49/502 |
| 2012/0299324 A1* | 11/2012 | Langenbacher et al. .. 296/37.13 |

* cited by examiner

*Primary Examiner* — Pinel Romain
(74) *Attorney, Agent, or Firm* — Quinn Law Group, PLLC

(57) ABSTRACT

A pocket forming trim panel for a vehicle door is provided. The pocket forming trim panel includes a panel portion and a pocket enclosure portion. The panel portion is configured to form a pocket opening. The pocket enclosure portion has a pocket floor portion and a pocket wall portion. The pocket enclosure portion is foldable with respect to the panel portion to complete the formation of a pocket on the door.

20 Claims, 2 Drawing Sheets

POCKET FORMING TRIM PANEL FOR A VEHICLE DOOR AND METHOD

TECHNICAL FIELD

This disclosure for a vehicle relates to a trim panel for a vehicle door and a method for manufacturing the same.

BACKGROUND

Vehicle doors are typically made of stamped sheet metal or some other structural material. The interior of the vehicle doors are normally covered or trimmed for both aesthetic and functional purposes with a door trim panel made of plastic and/or other formable materials. Most door trim panels include a pocket for convenient storage of maps, papers, tools, and other items.

Door trim panels are typically sub-assemblies of multiple molded parts. In particular, multiple molded parts may be necessary to create a pocket, because a pocket shape usually requires the use of highly complex and expensive molding tools and processes. While door trim panels may be made from a single molded part, these one-piece door trim panels do not always include a pocket.

SUMMARY

A pocket forming trim panel for a vehicle door includes a panel portion and a pocket enclosure portion. The panel portion has a pocket opening. The pocket enclosure portion has a pocket floor portion and a pocket wall portion. The pocket enclosure portion is foldable with respect to the panel portion to complete the formation of a pocket on the inside of the door.

The panel portion and the pocket enclosure portion of the pocket forming trim panel may be formed as a single unitary component. The pocket enclosure portion may be foldable with respect to the panel portion via a living hinge between the panel portion and the pocket portion.

The panel portion and the pocket enclosure portion may have features to facilitate fastening of the pocket enclosure portion to the panel portion when the pocket enclosure portion is folded with respect to the panel portion to complete the pocket. The panel portion feature may be a boss. The pocket enclosure portion feature may be an opening in the pocket enclosure portion. The feature or features may facilitate heat stake fastening. In another embodiment, the feature or features may facilitate snap-fit fastening.

The panel portion may include a support feature configured to support the pocket floor portion when the pocket enclosure portion is folded with respect to the panel portion to complete the pocket. The support feature may be a duck bill feature. In another embodiment, the support feature may facilitate snap-fit fastening of the pocket floor portion to the panel portion.

A vehicle includes a door panel and a pocket forming trim panel attachable to the door panel. The pocket forming trim panel includes a trim panel portion, a pocket enclosure portion, and a living hinge portion between the trim panel portion and the pocket enclosure portion. The trim panel portion has a pocket opening. The pocket enclosure portion has a pocket floor portion and a pocket wall portion. The pocket enclosure portion is foldable with respect to the trim panel portion via the living hinge portion to complete the formation of a pocket on the inside of the door. The trim panel portion, the pocket enclosure portion, and the living hinge portion of the pocket forming trim panel may be formed as a single unitary component.

A method of making a door pocket forming trim panel for a vehicle door includes forming a vehicle trim panel having a panel portion which includes a pocket opening, a pocket enclosure portion which includes a pocket floor portion and a pocket wall portion, and a living hinge portion located between the panel portion and the pocket enclosure portion. The method also includes folding the pocket enclosure portion with respect to the panel portion on the living hinge portion to complete the formation of a pocket. And, the method includes fastening the pocket enclosure portion to the panel portion. Forming the vehicle trim panel may include forming some or all of the vehicle trim panel portions in one piece. The method of forming the pocket forming trim panel may be molding.

The method may also include molding a support on the trim panel portion for supporting the pocket floor portion when the pocket enclosure portion is folded with respect to the panel portion to complete the pocket. The method may also include molding features on the panel portion and the pocket enclosure portion to facilitate fastening of the pocket enclosure portion to the panel portion when the pocket enclosure portion is folded with respect to the panel portion to complete the pocket. The cooperation of the features molded may facilitate heat stake fastening. In another embodiment, the cooperation of the features molded may facilitate snap-fit fastening.

The above features and advantages and other features and advantages of the present teachings are readily apparent from the following detailed description of the best modes for carrying out the present teachings when taken in connection with the accompanying drawings.

DETAILED DESCRIPTION

Figure 1:
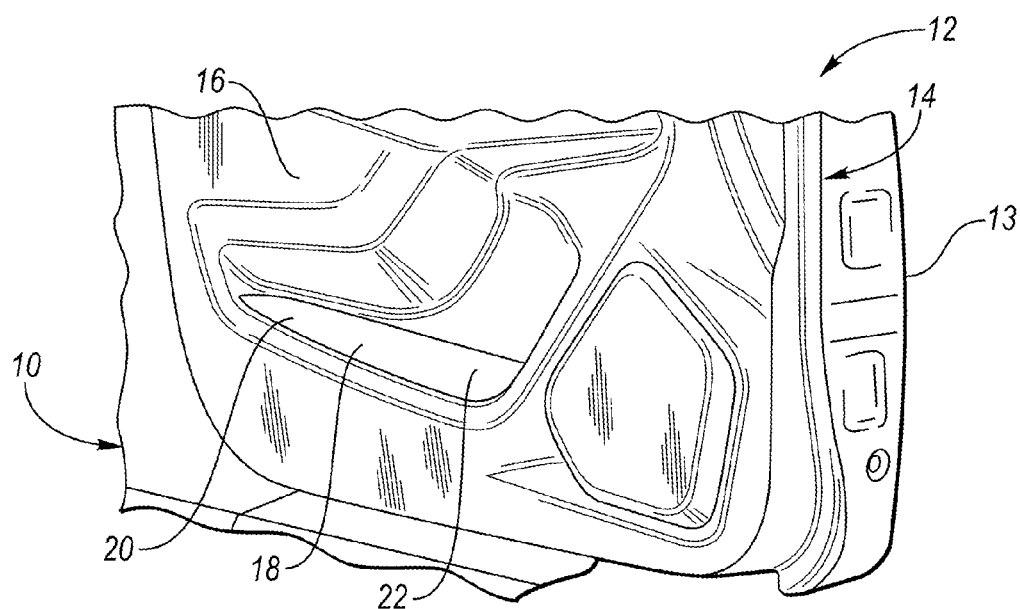
FIG. 1 is a fragmentary schematic perspective view from the inside of a vehicle having a door panel and a pocket forming trim panel.

Referring to the drawings, wherein like reference numbers refer to like components throughout the views, FIG. 1 shows a fragment of a vehicle 10 having a door 12 with a door panel 13 and a pocket forming trim panel 14, as viewed from the inside of the vehicle 10. The door panel 13 may be made of stamped sheet metal or of any other suitable structural material. The pocket forming trim panel 14 may be a non-metallic. Non-metallics that may be used include, but are not limited to, plastic, rubber, composite material, plastic backed fabrics, and layered materials. The pocket forming trim panel 14 may be injection molded or may be formed in any other suitable manner.

The pocket forming trim panel 14 has a panel portion 16 and a pocket enclosure portion 22. The panel portion 16 is configured to form a pocket opening 20 for a pocket 18 in the pocket forming trim panel 14.

Figure 2:
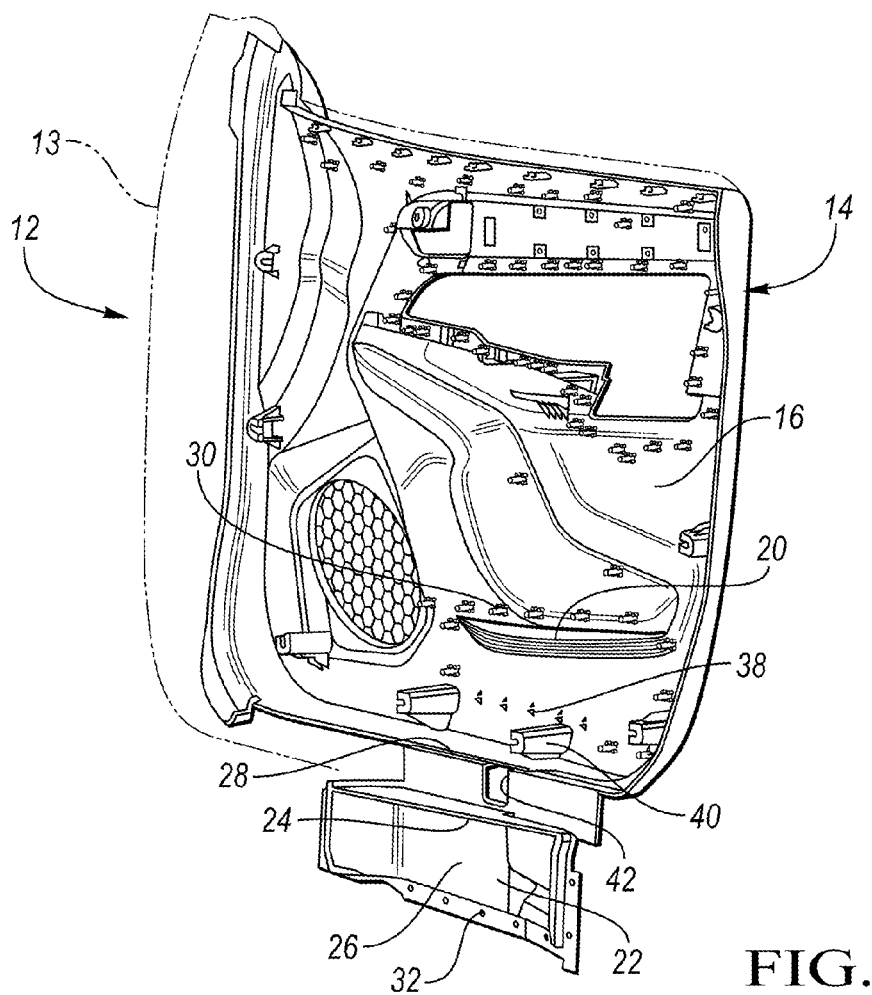
FIG. 2 is a schematic perspective view from the outside of the vehicle showing the pocket forming trim panel of FIG. 1 in the as-molded or as-formed state including a panel portion, a pocket enclosure portion, and a living hinge.

Referring now to FIG. 2, the pocket forming trim panel 14 is shown in its as-molded or as-formed condition, as viewed from the outer side of the trim panel 14. The pocket 18 may be molded or formed in the trim panel 14 such that the pocket enclosure portion 22 and trim panel portion 16 may be formed together as single unitary component. The following paragraphs describe how this may be done.

The pocket enclosure portion 22 has a pocket floor portion 24 and a pocket wall portion 26. The pocket enclosure portion 22 is foldable with respect to the panel portion 16 sufficiently to complete the formation of the pocket 18 on the door 12.

The pocket enclosure portion 22 may be foldable with respect to the panel portion 16 via a living hinge 28 disposed between the panel portion 16 and the pocket enclosure portion 22. The living hinge 28 may be created by molding or forming a reduced thickness or foldable area in the pocket forming trim panel 14 between the panel portion 16 and the pocket enclosure portion 22. Other types of hinge configurations may be used including, but not limited to, hingeable configurations that are molded, formed, perforated, machined, or cut into the pocket forming trim panel 14.

The panel portion 16 may have a panel portion feature 30 and the pocket enclosure portion 22 may have a pocket enclosure portion feature 32. The features 30, 32 may be configured to cooperate with each other to facilitate fastening of the pocket enclosure portion 22 to the panel portion 16 when the pocket enclosure portion 22 is folded with respect to the panel portion 16 sufficiently to complete the formation of the pocket 18 on the door 12.

The panel portion feature 30 may include a panel fastener portion and the pocket enclosure portion feature 32 may include a pocket enclosure fastener portion configured to cooperate with the panel fastener portion to facilitate fastening of the pocket enclosure portion 22 to the panel portion 16 when the pocket enclosure portion 22 is folded with respect to the panel portion 16 sufficiently to complete the formation of the pocket 18 on the door 12.

The panel portion feature 30 may be a boss configured to facilitate heat stake fastening. The pocket enclosure portion feature 32 may be an opening formed in the pocket enclosure portion 22. The boss may be configured to cooperate with the opening to facilitate heat stake fastening.

In another embodiment, the configurations of the panel portion feature 30 and the pocket enclosure portion feature 32 may cooperate to facilitate snap-fit fastening of the pocket enclosure portion 22 to the panel portion 16. The panel portion feature 30 may be a snap-fit feature and the pocket enclosure portion feature 32 may be an opening formed in the pocket enclosure portion 22. The snap-fit feature may be configured to cooperate with the opening to facilitate snap-fit fastening.

The pocket forming trim panel 14 may also include a door attachment feature 40 to facilitate attachment of the pocket forming trim panel 14 to the door panel 13 of the door 12.

The pocket enclosure portion 22 may be configured to form a door attachment feature clearance hole 42 to facilitate attachment of the pocket forming trim panel 14 to the door panel 13 of the door 12 via the door attachment feature 40.

Figure 3:
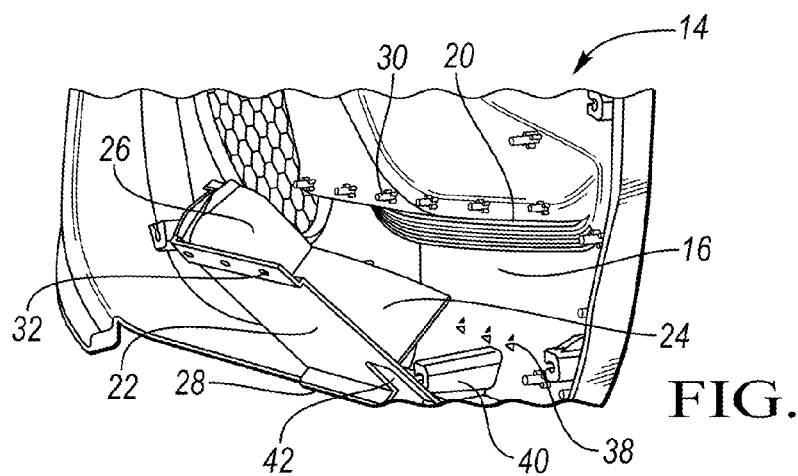
FIG. 3 is a fragmentary schematic perspective view from the outside of the vehicle showing the pocket forming trim panel of FIG. 2 with part of the pocket enclosure portion removed and with the pocket enclosure portion partially folded on a living hinge toward the panel portion.
Figure 4:
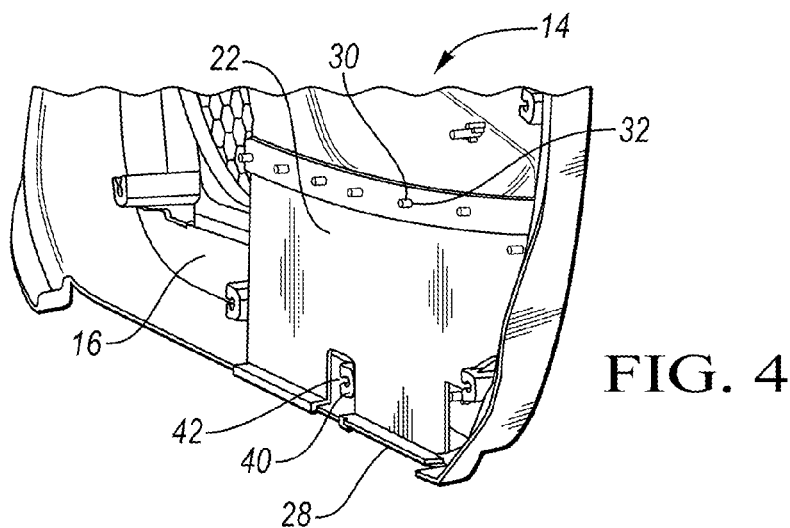
FIG. 4 is a fragmentary schematic perspective view from the outside of the vehicle showing the pocket forming trim panel of FIG. 3 with the pocket enclosure portion fully folded toward the panel portion to complete the formation of a pocket on the inside of the door.

FIGS. 3 and 4 show the folding of the pocket enclosure portion 22 with respect to the panel portion 16 to complete the formation of the pocket 18 on the door 12. Referring now to FIG. 3, a fragment of the pocket forming trim panel 14 is shown from the outer side of the vehicle 10 with part of the pocket enclosure portion 22 removed and with the pocket enclosure portion 22 partially folded with respect to the panel portion 16 via the living hinge 28.

Referring now to FIG. 4, the pocket forming trim panel 14 is shown from the outer side of the vehicle 10 with the pocket enclosure portion 22 fully folded with respect to the panel portion 16 via the living hinge 28 to complete the formation of the pocket 18 on the inside of the door 12. FIG. 4 also shows the cooperation between the panel portion feature 30 and the pocket enclosure portion feature 32 to facilitate fastening of the pocket enclosure portion 22 to the panel portion 16 when the pocket enclosure portion 22 is folded. In this embodiment, the panel portion feature 30 is a boss and the pocket enclosure portion feature 32 is an opening formed in the pocket enclosure portion 22. The boss is configured to cooperate with the opening to facilitate heat stake fastening.

Figure 5:
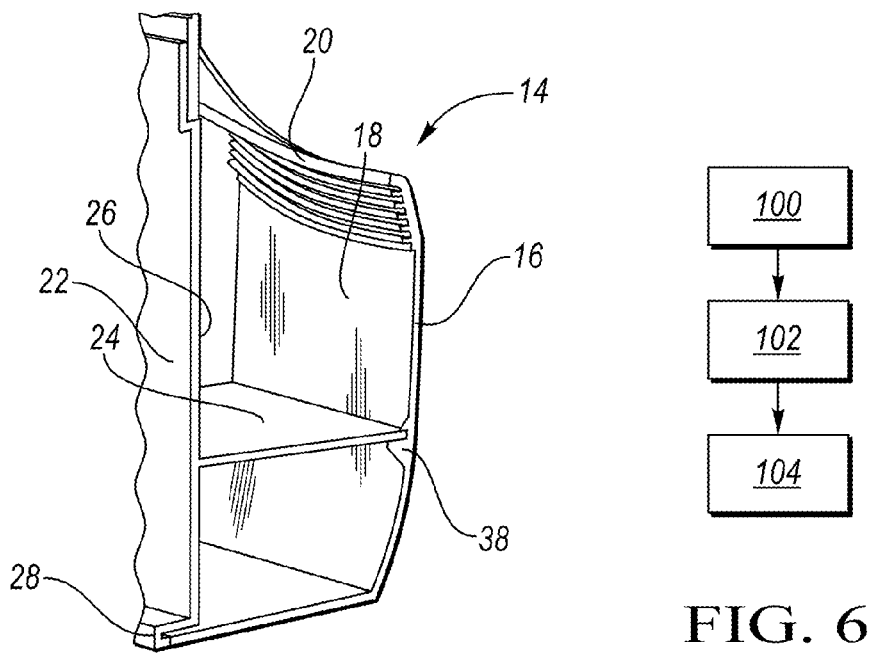
FIG. 5 is a fragmentary schematic perspective section view showing the pocket forming trim panel of FIG. 4 with the pocket enclosure portion fully folded toward the panel portion to complete the formation of the pocket on the inside of the door.

Referring now to FIG. 5, a fragmentary schematic perspective section view of the pocket forming trim panel 14 is shown with the pocket enclosure portion 22 fully folded with respect to the panel portion 16. The panel portion 16 may include a support feature 38 configured to support the pocket floor portion 24 when the pocket enclosure portion 22 is folded. The support feature 38 may be a duck bill feature, as shown. The duck bill feature may include an upper rib and a lower rib formed in the panel portion 16. The upper and lower ribs of the duck bill feature may be configured to cooperate with the pocket floor portion 24 to prevent the pocket floor portion 24 from moving up or down when the pocket enclosure portion 22 is folded. In another embodiment, the support feature 38 may be configured to cooperate with the pocket floor portion 24 to facilitate snap-fit fastening of the pocket floor portion 24 to the panel portion 16.

Figure 6:
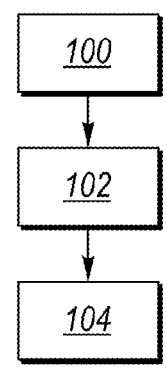
FIG. 6 is a flowchart of a method for manufacturing the pocket forming trim panel.

Referring now to FIG. 6, a method to manufacture a pocket forming trim panel 14 includes forming or molding 100 a pocket forming trim panel 14 having a panel portion 16 configured to form a pocket opening 20, a pocket enclosure portion 22 having a pocket floor portion 24 and a pocket wall portion 26, and a living hinge portion 28 disposed between the panel portion 16 and the pocket enclosure portion 22. The method also includes folding 102 the pocket enclosure portion 22 with respect to the panel portion 16 via the living hinge portion 28 sufficiently to complete the formation of a pocket 18 on the door 12. And, the method includes fastening 104 the pocket enclosure portion 22 to the panel portion 16.

Forming or molding 100 may include molding the panel portion 16, the pocket enclosure portion 22, and the living hinge portion 28 as a single unitary component. Molding or forming 100 may also include molding a support feature 38 on the panel portion 16 for supporting the pocket floor portion 24 when the pocket enclosure portion 22 is folded with respect to the panel portion 16 to complete the formation of the pocket 18 on the door 12.

Molding or forming 100 may also include molding features 30, 32 on the panel portion 16 and the pocket enclosure portion 22 configured to cooperate with each other to facilitate fastening of the pocket enclosure portion 22 to the panel portion 16 when the pocket enclosure portion 22 is folded with respect to the panel portion 16 sufficiently to complete the formation of the pocket 18 on the door 12. Folding 102 may be done via other hinge configurations including, but not limited to, hinge configurations that are molded, formed, perforated, machined, or cut into the pocket forming trim panel 14. Fastening 104 may be done by heat stake fastening. In another embodiment, fastening 104 may be done by snap-fit fastening.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A pocket forming trim panel for a vehicle door comprising:
 a panel portion configured to form a pocket opening; and
 a pocket enclosure portion having a pocket floor portion and a pocket wall portion; and
 wherein the pocket enclosure portion is foldable with respect to the panel portion sufficiently to complete the formation of a pocket on the door.

2. The pocket forming trim panel of claim 1, wherein the panel portion and the pocket enclosure portion are formed as a single unitary component.

3. The pocket forming trim panel of claim 1, wherein the pocket enclosure portion is foldable with respect to the panel portion via a living hinge.

4. The pocket forming trim panel of claim 1, wherein the panel portion has a panel portion feature and the pocket enclosure portion has a pocket enclosure portion feature configured to cooperate with the panel portion feature to facilitate fastening of the pocket enclosure portion to the panel portion when the pocket enclosure portion is folded with respect to the panel portion.

5. The pocket forming trim panel of claim 4, wherein the panel portion feature includes a panel fastener portion and the pocket enclosure portion feature includes a pocket enclosure fastener portion configured to cooperate with the panel fastener portion to facilitate fastening of the pocket enclosure portion to the panel portion when the pocket enclosure portion is folded with respect to the panel portion.

6. The pocket forming trim panel of claim 4, wherein the panel portion feature is a boss configured to facilitate heat stake fastening of the pocket enclosure portion to the panel portion when the pocket enclosure portion is folded with respect to the panel portion.

7. The pocket forming trim panel of claim 6, wherein the pocket enclosure portion feature defines an opening formed in the pocket enclosure portion; and wherein the boss is configured to cooperate with the opening to facilitate the heat stake fastening of the pocket enclosure portion to the panel portion when the pocket enclosure portion is folded with respect to the panel portion.

8. The pocket forming trim panel of claim 4, wherein the configurations of the panel portion feature and the pocket enclosure portion feature cooperate to facilitate snap-fit fastening of the pocket enclosure portion to the panel portion when the pocket enclosure portion is folded with respect to the panel portion.

9. The pocket forming trim panel of claim 4, wherein the panel portion feature is a snap-fit feature and the pocket enclosure portion feature defines an opening formed in the pocket enclosure portion; and wherein the snap-fit feature is configured to cooperate with the opening to facilitate snap-fit fastening.

10. The pocket forming trim panel of claim 1, wherein the panel portion includes a support feature configured to support the pocket floor portion when the pocket enclosure portion is folded with respect to the panel portion.

11. The pocket forming trim panel of claim 10, wherein the support feature includes a duck bill feature having an upper rib and a lower rib; and wherein the ribs are configured to prevent the pocket floor portion from moving up or down when the pocket enclosure portion is folded with respect to the panel portion.

12. The pocket forming trim panel of claim 10, wherein the support feature is further configured to cooperate with the pocket floor portion to facilitate snap-fit fastening of the pocket floor portion to the panel portion when the pocket enclosure portion is folded with respect to the panel portion.

13. A method to manufacture a pocket forming trim panel for a vehicle door comprising:
 forming a vehicle trim panel having a panel portion configured to form a pocket opening, a pocket enclosure portion having a pocket floor portion and a pocket wall portion, and a living hinge portion between the panel portion and the pocket enclosure portion;
 folding the pocket enclosure portion with respect to the panel portion via the living hinge sufficiently to complete the formation of a pocket on the door; and
 fastening the pocket enclosure portion to the panel portion.

14. The method of claim 13, wherein forming includes molding the panel portion, the pocket enclosure portion, and the living hinge portion as a single unitary component.

15. The method of claim 13, wherein forming includes molding a support feature on the panel portion for supporting the pocket floor portion when the pocket enclosure portion is folded with respect to the panel portion; and wherein forming includes molding respective attachment features on the panel portion and the pocket enclosure portion that cooperate with each other to facilitate fastening of the pocket enclosure portion to the panel portion when the pocket enclosure portion is folded with respect to the panel portion.

16. The method of claim 15, wherein fastening includes cooperation of the respective attachment features on the panel portion and the pocket enclosure portion to facilitate heat stake fastening of the pocket enclosure portion to the panel portion when the pocket enclosure portion is folded with respect to the panel portion.

17. The method of claim 15, wherein fastening includes cooperation of the respective attachment features on the panel portion and the pocket enclosure portion to facilitate snap-fit fastening of the pocket enclosure portion to the panel portion when the pocket enclosure portion is folded with respect to the panel portion.

18. A vehicle comprising:
 a door having a door panel; and
 a trim panel attached to the door panel, the trim panel having a panel portion configured to form a pocket opening, a pocket enclosure portion having a pocket floor portion and a pocket wall portion, and a living hinge portion between the panel portion and the pocket enclosure portion; wherein the pocket enclosure portion is folded with respect to the panel portion via the living hinge portion sufficiently to complete the formation of a pocket on the door.

19. The vehicle of claim 18, wherein the panel portion, the pocket enclosure portion, and the living hinge portion are formed as a single unitary component.

20. The vehicle of claim 18, wherein the panel portion and the pocket enclosure portion have respective attachment features configured to cooperate with each other to facilitate heat stake fastening of the pocket enclosure portion to the trim panel portion when the pocket enclosure portion is folded with respect to the trim panel portion via the living hinge; and wherein the trim panel portion has a duck bill feature having an upper rib and a lower rib; and wherein the ribs are configured to prevent the pocket floor portion from moving up or down when the pocket enclosure portion is folded with respect to the panel portion via the living hinge.

* * * * *